United States Patent [19]
Gore et al.

[11] 3,710,591
[45] Jan. 16, 1973

[54] CLUTCH FOR USE IN THE PLUMBING FIELD

[75] Inventors: William C. Gore, Elgin; Eugene B. Shapiro, Highland Park, both of Ill.

[73] Assignee: Beatrice Foods Company, Skokie, Ill.

[22] Filed: Feb. 8, 1971

[21] Appl. No.: 113,142

[52] U.S. Cl. .................................64/30 R, 192/56 R
[51] Int. Cl. ................................................F16d 7/02
[58] Field of Search ......192/56 R; 64/30 R, 30 A, 29

[56] References Cited

UNITED STATES PATENTS

| | | | |
|---|---|---|---|
| 2,482,995 | 9/1949 | Willis | 64/29 |
| 2,834,191 | 5/1958 | Toothill | 192/56 R |
| 3,442,360 | 5/1969 | Fulop | 192/56 R |

*Primary Examiner*—Charles J. Myhre
*Assistant Examiner*—Randall Heald
*Attorney*—Max R. Kraus

[57] ABSTRACT

A power driven clutch comprising a carrier housing, the forward end of which is adapted to be connected to an object to be rotated, such as an auger, a screwdriver bit, a socket wrench, or the like, said carrier housing having a bore adapted to receive an axially movable member which is connected to said carrier housing, said axially movable member having a facing surface, and a driver member supported within the bore of said carrier housing and having a facing surface to make contact with the facing surface of said axially movable member for rotating same, said driver adapted to be connected to a source of rotative power. The axially movable member is adapted to move axially within said carrier housing in a direction away from the driver when the carrier housing rotation is arrested, such as when the object supported by the carrier housing strikes an obstruction, so that the facing surfaces of said driver and said axially movable member are permitted to slip with respect to each other.

3 Claims, 4 Drawing Figures

PATENTED JAN 16 1973 3,710,591

INVENTOR
WILLIAM C. GORE
EUGENE B. SHAPIRO

BY
*Max R. Kraus*
ATTORNEY

CLUTCH FOR USE IN THE PLUMBING FIELD

BRIEF SUMMARY OF THE INVENTION

One of the objects of this invention is to provide a device, one end of which is adapted to be connected to an auger, a screwdriver bit, a socket wrench, or the like, with the opposite end of the device adapted to be connected to a source of rotative power, such as a drill or the like, which device has clutching means so constructed that when the driven object encounters an obstruction that arrests rotation, the clutch will permit the driver to continue its rotation without damaging the driven object or causing the rotative power source, such as the electric drill motor or the like to burn out.

Another object of this invention is to provide a structure of the foregoing character which is economical to produce and highly efficient in operation.

Other objects will become apparent as this description progresses.

Figure 1:
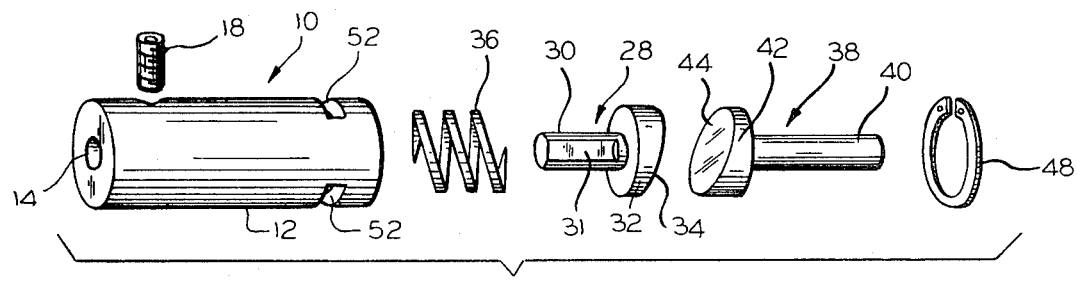
FIG. 1 is an exploded view of the clutch forming this invention.
Figure 2:
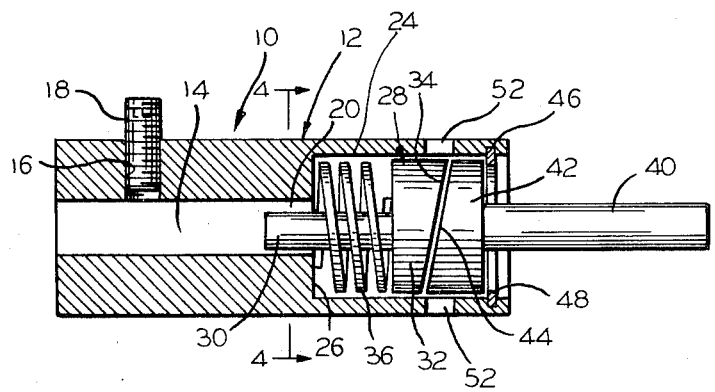
FIG. 2 is a longitudinal sectional view of the clutch in assembled relation.
Figure 4:
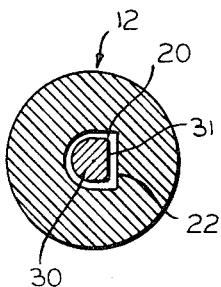
FIG. 4 is a section taken on line 4—4 of FIG. 2.
Figure 3:
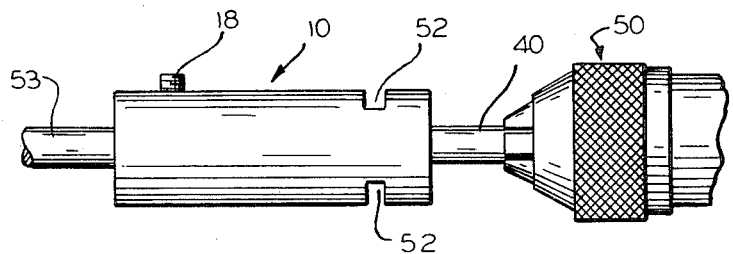
FIG. 3 is a view of the clutch connected to a power tool.

The device is made preferably of metal and lends itself to automatic screw machine production. It includes a housing which forms the housing for a carrier or driven member generally indicated at 10, having a cylindrical body generally indicated at 12 which contains a longitudinal bore 14 adjacent the front thereof, which bore may be round, square, hexagon, or of any other shape. An internally threaded bore 16 extends substantially at right angles to the longitudinal bore 14 and receives a locking screw 18. Extending rearwardly of the bore 14 is a continuing bore 20 which is of D-shape in cross-section and having a flat surface 22. The carrier has an enlarged annular bore 24 extending rearwardly to the opposite end of the carrier. An annular shoulder 26 is provided between the D-shaped bore 20 and the enlarged annular bore 24.

The driven member also includes an axially movable member generally designated by the numeral 28 and comprises a D-shaped stem 30 in cross-section having a flat surface 31 which is shaped to correspond to the D-shaped bore 20 in the carrier. The D-shaped stem 30 is adapted to be received in the D-shaped bore 20. The axially movable member 28 includes a head 32 having an angular or inclined surface or face 34. A coil spring 36 is positioned to surround said D-shaped stem 30, with the front end of said spring adapted to engage the shoulder 26 and the opposite end of the spring engaging the back of the head 32. The axially movable member 28 is normally urged rearwardly within the carrier by means of the spring 36 but said axially movable member 28 will be moved axially forward in said carrier to compress the spring, as will be more fully explained hereinafter.

Positioned within the enlarged annular bore 24 of the carrier 10 is a driver member generally indicated by the numeral 38. Said driver member comprises an annular stem 40 and an enlarged head 42 which has an angular surface or face 44 complementary to the angular surface 34 of the head 32 of the driven member. The enlarged bore 24 of the carrier has adjacent its rear end an annular groove 46 which receives the spring ring 48 to captivate the parts. The back of the head 42 of the driver member 38 will engage the spring ring 48 and prevent the driver and the other parts from moving outwardly of the carrier. The outer end of the stem 40 of the driver extends outwardly of the carrier and same is adapted to be engaged by a source of rotative power, generally indicated at 50, such as an electric drill motor or the like which is connected to the end of the stem 40 of the driver for the purpose of rotating same. The cylindrical body 12 of the carrier is provided with a pair of diametrically opposed transversely extending slots 52, the purpose of which is to permit a visual inspection of the interior by viewing same through said slots.

In normal operation the angular faces 34 and 44 of the heads 32 and 42 respectively, will be in engagement with each other and by the rotation of the driver 38 will produce a corresponding rotation to the carrier or driven member 12 which holds the auger or other object to be rotated, generally indicated at 53; said object is positioned in the longitudinal bore 14 and secured by the screw 18. However, should the auger or other object to be rotated strike an obstruction and be prevented from rotating with the continued rotation of the driver, the faces 44 and 34 of the driver head 42 and the driven head 32 will be caused to move relative to each other, that is, the head 42 on the driver 38 will slip relative to the head 32 of the axially movable driven member 28 and will thereby cause the driven member 28 to slide axially inwardly into the carrier against the compression of the spring 36. Thus, as the driver member 38 is rotating it is slipping with respect to the driven member 28 and while the rotative power continues to rotate the driver it will not effect a corresponding rotation to the driven member and hence it will protect the auger or object 53 being rotated by the carrier from being damaged and it will also prevent burning out of the electric motor power member connected to and driving the driver member.

After the rotating member 53, i.e., the auger or the like, passes the obstruction, the spring 36 will move or slide the driven member 28 rearwardly in the carrier and when the two faces of the driver and the driven member are in proper engagement, the driver will then affect a clutching between the driver head and the driven head to rotate said carrier and the object held thereby.

What is claimed is:

1. A clutch for rotating an object such as a wire auger, screwdriver bit, screw wrench, and the like, comprising a single integrally formed cylindrical body of a uniform dimension along its entire exterior length, said body forming a housing having a longitudinal bore extending from one end of the housing and an enlarged annular bore extending from the opposite end which communicates with the longitudinal bore, an axially movable driven member positioned in said housing having a head positioned in the enlarged bore and a stem extending into said longitudinal bore, means for coupling said stem to said housing so that they are simultaneously rotatable, said head having an overall planar inclined facing surface, a driver member having a head positioned in said enlarged bore and having a stem extending exteriorly of the housing at the opposite end of the housing to be engaged by a rotative power source, said driver member head having a complementary overall planar inclined facing surface, said enlarged bore having means positioned within the interior thereof adjacent the opposite end of the enlarged bore for engaging the head of the driver for limiting the outward movement of said driver, and spring means engaging the head of the driven for normally urging said facing surfaces into engagement with each other so that there is contact through the entire facing surfaces when the driver is rotating said driven member and to permit slippage therebetween when said driven member is prevented from being rotated while the driver is rotating.

2. A clutch as set forth in claim 1 in which the carrier housing is provided with a slot whereby the position of the facing surfaces may be observed.

3. A clutch as set forth in claim 1 in which the means for coupling said stem to said housing includes having the stem of the axially movable driven member generally D-shaped with said stem engaging a correspondingly shaped bore portion in said longitudinal bore so that said axially movable driven member rotates said housing but in which said axially movable member is slidable axially within said housing.

* * * * *